UNITED STATES PATENT OFFICE.

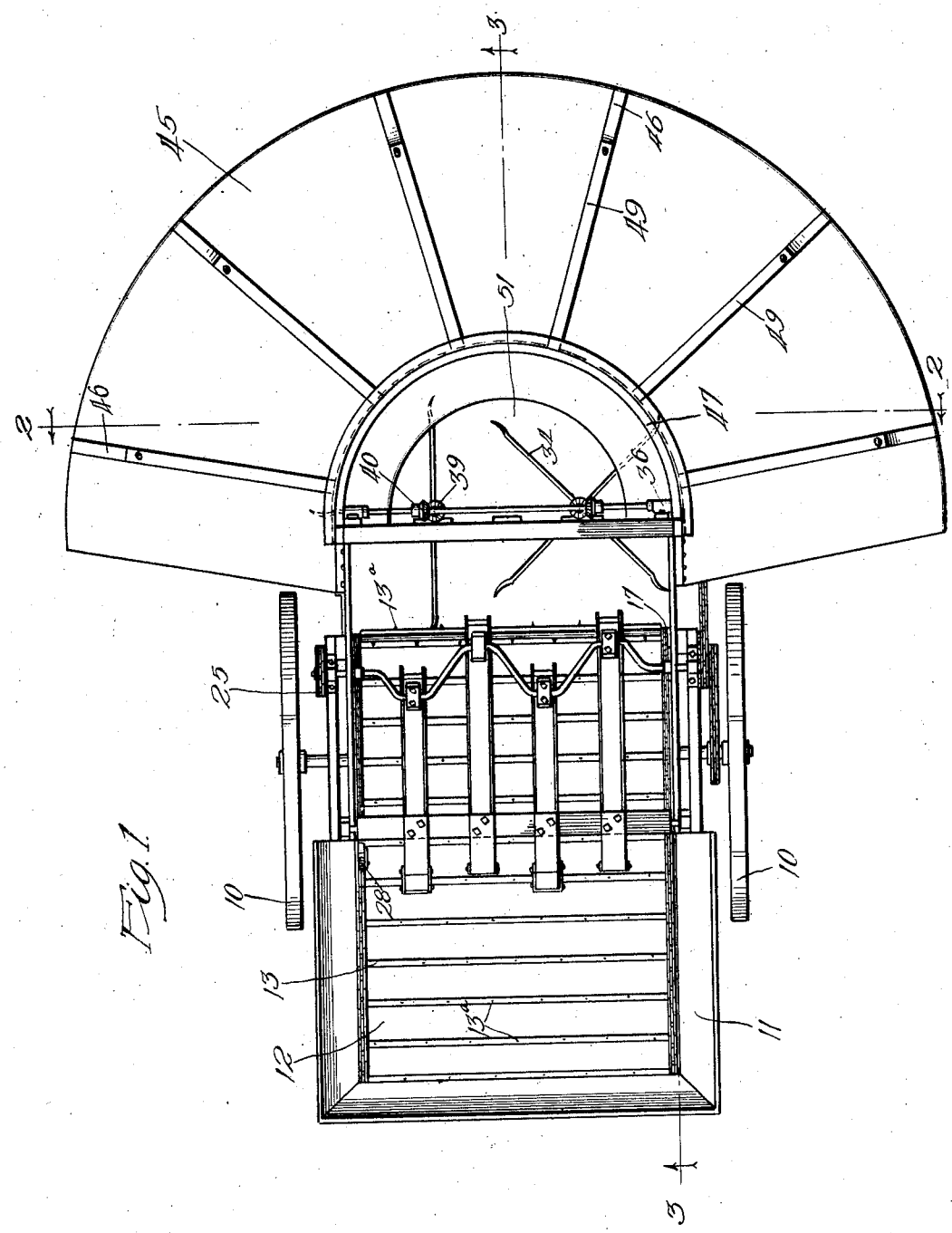

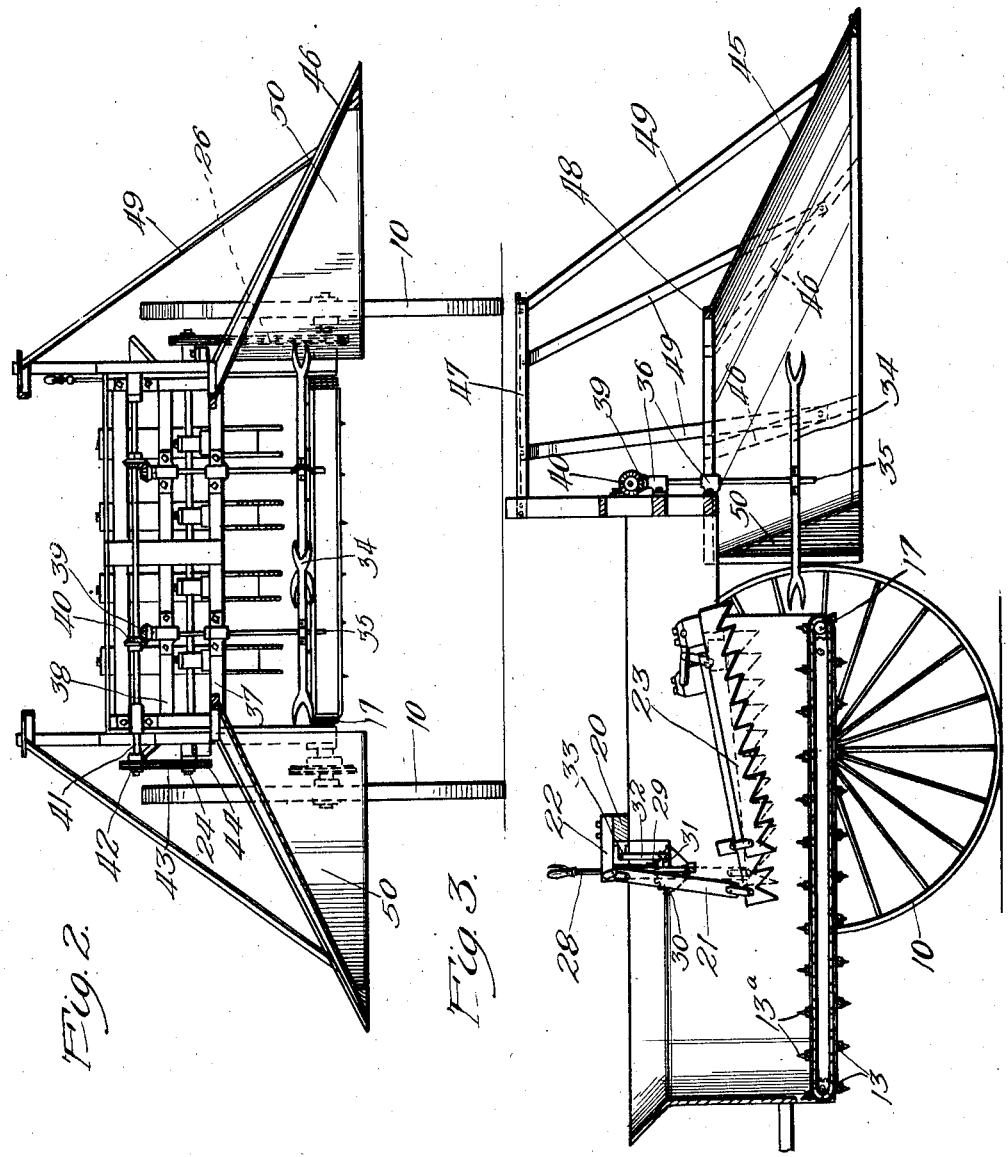

GEORGE W. WILLIAMS, OF MORRIS, ILLINOIS.

SPREADER.

1,345,427.      Specification of Letters Patent.      Patented July 6, 1920.

Application filed October 4, 1919. Serial No. 328,533.

*To all whom it may concern:*

Be it known that I, GEORGE W. WILLIAMS, a citizen of the United States of America, and resident of Morris, Grundy county, Illinois, have invented a certain new and useful Improvement in Spreaders, of which the following is a specification.

My invention relates to an improvement in spreaders—that is, to an improvement in agricultural implements for spreading fertilizing materials over the surface of the ground.

The object of my invention is to provide a highly improved and efficient machine in which the material is spread evenly and uniformly over the ground, and in which the material being spread is so protected from the wind that it is not blown or scattered about during the spreading operation, but is spread evenly and uniformly over the ground.

These and other features and objects of my invention will be more clearly understood by having reference to the accompanying drawings, in which I have illustrated my invention in connection with a straw spreader of the type disclosed in my copending application Serial No. 289,042, filed April 10, 1919, although it will be understood that my invention is adapted for use in connection with other forms of straw spreaders or implements for spreading other fertilizing materials.

Figure 1 is a plan view of a spreader embodying the features of my invention.

Fig. 2 is a transverse sectional view taken on the line 2—2 of Fig. 1, looking in the direction of the arrows.

Fig. 3 is a longitudinal sectional view.

The spreader illustrated consists essentially of a cart mounted on two wheels, 10, 10, which cart is adapted to be hitched to the rear of a wagon, in any suitable manner. This cart comprises a body portion 11, the bottom being formed by means of a movable apron 12, provided with a plurality of cross slats 13 carrying upwardly projecting pins or teeth 13ª. This apron passes around the shaft 17 at its rear end and is driven from the wheels 10 through the medium of suitable chain and sprocket connections, so that as the cart is drawn forwardly, the apron is revolved so as to positively feed the material in the cart rearwardly. Mounted intermediate the length of the cart and supported by the sides thereof, there is a cross beam 20 which supports a plurality of suspending members 21. The upper end of each of these suspending members is hinged to a short horizontal member 22 rigidly secured to the cross beam 20. The lower end of each of these suspending members 21 is hinged to the forward end of a reciprocating tooth bar or rake 23. In the construction illustrated, I have shown four of these rakes, but, of course, it will be understood that the number may be varied to suit varying conditions. The rear ends of these rakes are supported by a crank shaft journaled in opposite sides of the cart, near the rear end thereof, which crank shaft is provided with a sprocket 25, with which a chain 26 engages, this chain likewise passing over a sprocket 27 mounted upon the end of the cross shaft 17. In this manner the crank shaft is rotated by power derived from the wheels 10, and thus operates to reciprocate the rakes 23 over the traveling conveyer 12. These rakes are so mounted that their forward ends are slightly lower than their rear ends, and in order to adjust the distance between the forward ends of these rakes and the conveyer 12, to thereby regulate the amount of material being fed through the machine, I provide suitable means for rocking the cross beam 20. This consists of a hand-lever 28 pivoted at its lower end to one side of the cart, which lever is provided with a spring tooth engaging the rack 30 for holding the lever in any adjusted position. Rigidly connected to this lever, there is a short lateral projecting arm 31 to the end of which a link 32 is pivoted, the upper end of this link being pivoted to the arm 33 secured to the cross beam 20. By this construction, when the hand lever 28 is moved forwardly, the link 32 moves upwardly so as to rock the beam 30 to thereby pull upwardly on the suspending hangers 21, and thus raise the forward ends of the rakes.

Suspended at the rear of the cart are a pair of rotary beaters or spreaders 34 mounted upon vertically extending rods 35, journaled in bearings 36, carried by suitable cross bars 37, 38. On the upper end of each of these vertical rods is mounted a beveled pinion 39, which meshes with a corresponding bevel pinion 40 mounted upon a transverse shaft 41. Mounted upon the end of this shaft, there is a sprocket 42 which is driven by means of the sprocket chain 43 which passes over a sprocket 44 mounted upon the end of the crank shaft 24. With this construction, it will be seen that as the cart is drawn forward, the reciprocating rakes 23, in combination with the movable conveyer 12 at the bottom of the cart, operate to feed the material to the rear of the cart where it is engaged by the rapidly revolving arms 34, and thus scattered over the surface of the ground.

In order to protect the material thus scattered by the rotating beaters, and to prevent the wind from engaging the same and whirling it about and thus causing it to be widely and unevenly distributed over the surface of the ground, I provide at the rear of the machine a protecting hood which completely surrounds the rotating beaters and thoroughly and efficiently protects the material being scattered from the action of the wind, so that I am enabled to spread the material evenly and uniformly over a strip of ground of predetermined width. This hood consists essentially of a sheet of thin sheet metal 45 shaped substantially in the form of a half of a frustum of a cone. This hood is provided with suitable ribs 46 and is supported at the rear of the implement by means of two semi-circular hoops 47, 48, supported at the rear of the cart, suspending arms 49 extending from the upper hoop 47 to the outer edge of the hood. The forward ends of the hood fit over the sides of the cart and are secured to the rear ends thereof, the front end of the hood being inclined slightly rearwardly, as indicated in Fig. 1, to clear the wheels 10 and also being inclined downwardly toward the outer edge of the hood, as clearly shown in Fig. 2. In order to close the front end of the hood, where it extends outwardly from opposite sides of the cart, a triangular section 50 is provided on each side of the cart which extends from the cart to the edge of the hood. These end sections are preferably formed by merely bending the front edges of the hood downwardly and operate to close the end of the hood where it projects beyond the sides of the cart, and thus effectively prevents the wind from engaging the material under the hood. Immediately over the beaters, the hood is preferably cut away so as to form a semi-circular opening 51 which, when the beaters are being rapidly revolved, permits the air to be drawn downwardly and then swirled about by the beaters, and thus more effectively distribute the material. If desired, this opening can be omitted, although I find that better results are obtained by the use of same.

It will thus be seen that my improved hood completely surrounds the rotating beaters, terminating at its inner end in a plane above the beaters and then inclined downwardly so that its outer edge is in a plane below the beaters, and effectively prevents the wind from engaging the material being scattered by the beaters, and thus enables this material to be uniformly distributed over a strip of ground.

While I have illustrated and described one particular embodiment of my invention, and have illustrated same in connection with a straw spreader, it will be understood that I do not wish to be limited to such exact construction, or to its use in connection with a straw spreader, as it will be obvious that my improved hood may be modified to a certain extent without departing from the spirit of my invention, and that the same is adapted for use in connection with spreaders of different types, and that the disclosure of the straw spreader is merely for the purpose of illustrating one manner in which my invention may be successfully and effectively employed.

What I claim as my invention is:—

1. In a spreader, a hopper, means for delivering material from the rear of said hopper, and a conical-shaped hood secured to the rear of the hopper and being inclined downwardly and outwardly and extending laterally from the sides of said hopper to thereby effectively protect the material being delivered from said hopper from the action of the wind.

2. In a spreader, a hopper, one or more spreaders mounted to the rear of said hopper, means for feeding the material to said spreaders, and a conical-shaped hood secured to the rear of the hopper above said spreaders and surrounding the same, and being inclined downwardly and outwardly and terminating at a point below said spreaders to thereby effectively protect the material being operated upon by said spreaders from the action of the wind.

3. In a spreader, a hopper, one or more spreaders mounted to the rear of said hopper, means for feeding the material to said spreaders, and a conical hood secured to the rear of said hopper to a point above said spreaders, the outside edge of said hood terminating below the level of said spreaders and being provided with substantially vertically extending forward side portions for closing the front of said hood.

4. In a spreader, a hopper, one or more spreaders mounted to the rear of said hopper, means for feeding the material to said spreaders, and a hood surrounding said spreaders and protecting the same against the action of the wind, said hood extending laterally on opposite sides of said hopper and to the rear of the same and being provided with substantially vertical end walls for closing the front ends of the laterally extending portions of said hood.

Signed by me at Chicago, Illinois, this 30 day of Sept., 1919.

GEORGE W. WILLIAMS.